(12) United States Patent
Roberts et al.

(10) Patent No.: US 6,631,841 B2
(45) Date of Patent: Oct. 14, 2003

(54) ACCESS SYSTEM AND METHOD FOR BUSES

(75) Inventors: Allan Roberts, Lockport, IL (US); Thomas Mavec, Joliet, IL (US)

(73) Assignee: Robotics Technologies, Inc., Joliet, IL (US)

( * ) Notice: Subject to any disclaimer, the term of this patent is extended or adjusted under 35 U.S.C. 154(b) by 173 days.

(21) Appl. No.: 09/873,029

(22) Filed: Jun. 1, 2001

(65) Prior Publication Data

US 2002/0179705 A1 Dec. 5, 2002

(51) Int. Cl.$^7$ .................................................. G06K 7/00
(52) U.S. Cl. .................... 235/440; 235/382; 235/382.5; 705/5; 705/6; 705/13; 705/72
(58) Field of Search ........................... 235/440, 462.13, 235/461, 382, 382.5; 340/149, 174.1, 142; 70/278, 280; 705/72, 5, 6, 13

(56) References Cited

U.S. PATENT DOCUMENTS

| | | | | | |
|---|---|---|---|---|---|
| 3,590,333 | A | * | 6/1971 | Blum | 361/172 |
| 3,622,991 | A | * | 11/1971 | Lehrer et al. | 340/5.5 |
| 3,926,021 | A | * | 12/1975 | Genest et al. | 340/5.24 |
| 4,213,118 | A | * | 7/1980 | Genest et al. | 235/392.5 |
| 5,055,658 | A | * | 10/1991 | Cockburn | 235/382 |

* cited by examiner

*Primary Examiner*—Michael G. Lee
*Assistant Examiner*—Kimberly Nguyen
(74) *Attorney, Agent, or Firm*—Schiff Hardin & Waite

(57) ABSTRACT

In an access system and method for buses, a master card and respective slave cards for respective students are provided. The cards are read by a card reader to control access to the bus. A microprocessor and memory are provided together with an annunciator which determine whether a slave card annunciator code corresponds to an annunciator code on the master card, thus determining whether a respective student is boarding a bus which corresponds with his respective route.

10 Claims, 1 Drawing Sheet

ACCESS SYSTEM AND METHOD FOR BUSES

BACKGROUND OF THE INVENTION

Important administrative and safety considerations in the transportation of students on school buses are the assignment and tracking of students to specific, designated buses. From an economic perspective, many companies who contract transportation services to school districts are paid according to the number of students who actively ride their buses. As a matter of safety, it is imperative to ensure that students are boarding their assigned routes.

SUMMARY OF THE INVENTION

It is an object of the invention to provide a system and method which will ensure that students, when boarding school buses, are on the right school bus for the respective assigned routes.

According to the present invention, a method and apparatus are provided employing a master card and a slave card for respective students. A master card is assigned which uniquely corresponds to a given bus with an assigned route. A code identifier is encoded on the master card which is used as a reference for all succeeding slave cards as a means of validating whether students are on the correct bus. Each time a new master card is swiped by a card reader, a memory of the system is updated with the new master code. Thereafter, succeeding slave cards which are read by the card reader must match the master card code to receive a valid annunciation.

DESCRIPTION OF THE PREFERRED EMBODIMENT

Figure 1:
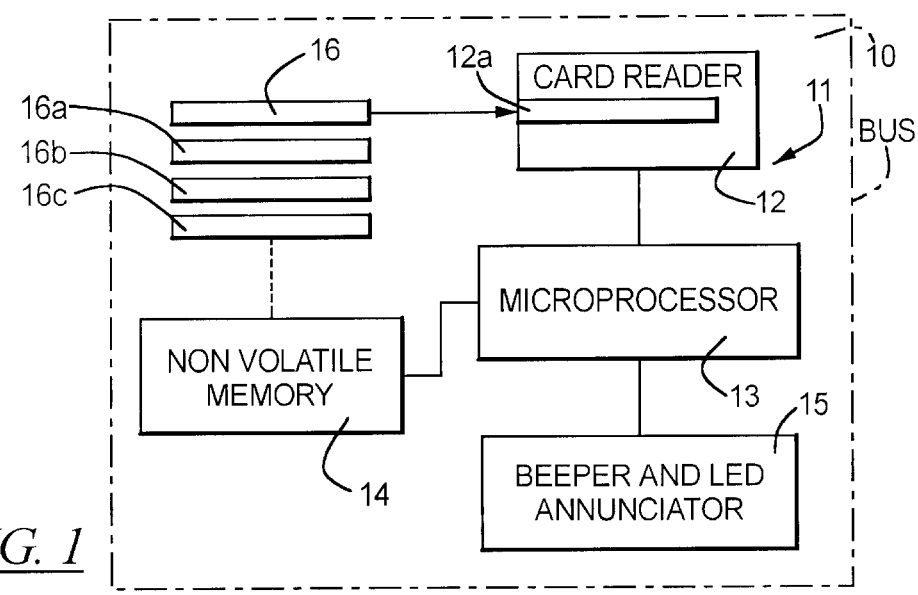
FIG. 1 is a block diagram showing the access system for buses according to the present invention.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended; and alterations and further modifications in the illustrated device and method, and further applications of the principles of the invention as illustrated therein are contemplated as would normally occur to one skilled in the art to which the invention relates.

As shown in FIG. 1, the access system and method for buses 10 containing the system generally shown at 11 employs a magnetic card reader 12 to control access to the bus 10. A master card 16 is assigned an identifying code uniquely corresponding to a given bus number or route. The identifying code containing numbers, letters and/or other types of indicia is encoded on the master card and is used as a reference code for all succeeding slave cards 16a–16c as a means of validating students being on the correct bus. The master card 16 identifying code is identical to an identifying code on the slave cards 16a–16c, but has an extra digit or letter, for example, that designates it as a master card. Each time a new master card 16 is swiped in the card reader 12, a system non-volatile memory 14 is updated for the new "master" identifying code. A master card is under control of a transportation administrator or bus driver.

Thereafter, the codes on all succeeding slave cards 16a–16c (student cards) swiped must match the master code to receive a "valid" annunciation. Annunciations, valid or invalid, may comprise a beeper and/or an LED annunciator 15 that is specific to an identifiable valid or invalid state.

Thus, the system which operates according to the method of the invention as shown in FIG. 1 comprises the card reader 12, the microprocessor 13, the non-volatile memory 14, and the annunciator 15. When a master or slave card is swiped in a slot 12a in the card reader, its encoded identifier code is decoded by the attached microprocessor 13. If the swiped card is a master card 16, then the encoded identifier code of the card is stored in the non-volatile memory 14 as a reference code for succeeding card swipes. If the swiped card is a slave card 16a–16c, then the encoded identifier code is compared against the previously stored master identifier code in memory for a match. If the slave identifier code matches the master identifier code, then the "valid" annunciation indicator is activated. Otherwise, the "invalid" annunciation is activated.

Figure 2:
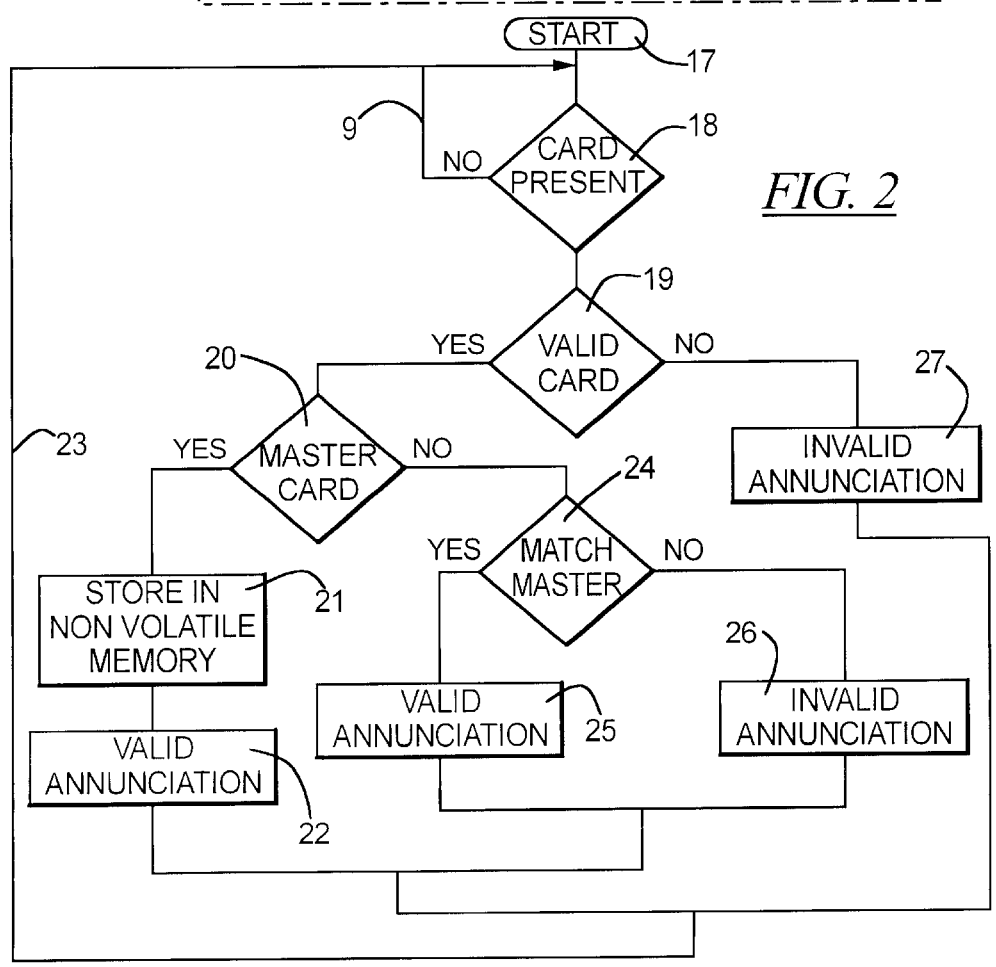
FIG. 2 is a flow chart showing the method steps performed by software in conjunction with a microprocessor in the system and method of the present invention.

A software flowchart showing method steps of the invention is illustrated in FIG. 2. Beginning at start block 17, the program loops through the "card present" block at 18 through loop 9 until the card is detected as present. If a bad read has occurred in "valid card" block 19, then the program annunciates an "invalid" state via the invalid annunciation block 27 and returns to loop for card presence through the feedback loop path 23.

Upon detection of a valid card presence at the "valid card☐ block 19, the decoded card identifier code is examined at "master card" block 20 to determine if it is a master card. If it is, then the immediate card identifier number is stored as the new master (reference) identifier code—see the "store in non-volatile memory" block 21 and the "valid annunciation" block 22. The program then loops through feedback loop path 23 to await the next card swipe.

If the valid card is not a master card, then it is a slave card. Its identifier code is compared with the stored master reference identifier code in the "match master" block 24. If the card identifier codes do not match, then an "invalid" annunciation is invoked via block 26, and the program returns to loop through feedback loop path 23 to loop for card presence. If the card identifier codes match, then a "valid" annunciation is invoked via "valid annunciation" block 25 and the program loops through feedback loop path 23 to await the next card swipe.

The present invention provides a simple, easily-installed and very cost-effective device that provides a tool for controlling and administrating student transportation.

Although in the preferred embodiment the card reader is shown as a magnetic card reader, other types of card readers may be employed such as optical or any other type appropriate for reading master and slave cards having magnetic, optical, bar code or any types of indicia.

Although the annunciator is preferably comprised of a beeper and an LED for audio and visual indications, any other type of annunciation may be provided including other types of lights and other types of sound producers.

Although a non-volatile memory 14 is provided, other types of memories may be employed with the microprocessor; and other variations may be provided in the software program flow evident to those skilled in the art.

While the invention has been illustrated and described in detail in the drawings and foregoing description, the same is to be considered as illustrative and not restrictive in character, it being understood that only a preferred embodiment has been shown and described and that all changes and modifications that come within the spirit of the invention are desired to be protected.

We claim as our invention:

1. A method for tracking of students entering a bus to ensure that the students are boarding the correct bus for a respective assigned route, comprising the steps of:

providing a card reader on the bus along with a processor and an associated memory and annunciator;

providing a master card having an identifier code corresponding to the respective assigned route, said master card also having an indicator identifying the card as a master card;

providing a respective slave card for each student who is to board the bus for said assigned route and wherein an identifier code is provided on the respective slave cards which matches the identifier code on the master card;

inserting the master card into the card reader on said bus, and checking with said processor for said indicator, and if said indicator is detected verifying that the inserted card is a master card, said processor then storing said master card identifier code into said memory; and inserting the respective student slave cards into the card reader of said bus and employing said processor to determine whether or not each of the inserted slave cards is a master card or a slave card by checking for said indicator, and if said indicator is not found and the card is identified as a slave card, then checking whether the identifier code on the slave card matches the stored master card identifier code, and if the identifier code matches activating a valid annunciation with said annunciator indicating that the student is on the correct bus for said respective assigned route, and if the identifier code does not match, then providing an invalid annunciation indicating that the student is on the wrong bus.

2. The method according to claim 1 wherein the annunciator provides a visual annunciation.

3. The method according to claim 1 wherein the annunciator provides an audible annunciation.

4. The method according to claim 1 wherein the identifier code for the master card comprises a plurality of digits having a base code and an extra digit as said indicator that designates it as a master card.

5. The method according to claim 1 wherein the card reader comprises a magnetic card reader.

6. The method according to claim 1 wherein the memory comprises a non-volatile memory.

7. The method according to claim 1 wherein when both the master card and the slave cards are inserted into said card reader, the processor checks whether or not a valid card has been read prior to checking for the indicator to determine whether or not the inserted card is a master card.

8. The method according to claim 1 wherein when both the master card and the slave cards are inserted into said card reader, the processor checks whether or not a valid card has been read prior to checking as to whether or not the inserted card is a master card.

9. The method according to claim 1 wherein after the inserted master card is identified by the indicator as the master card and the identifier code has been stored, the annunciator provides a valid annunciation.

10. A method for tracking of students entering a bus to ensure that the students are boarding the correct bus for a respective assigned route, comprising the steps of:

providing a card reader on the bus along with an associated logic and memory equipment;

providing a master card having an identifier code corresponding to the respective assigned route;

providing a respective slave card for each student who is to board the bus for said assigned route and wherein an identifier code is provided on the respective slave cards which matches the identifier code on the master card;

at least one of said master card and slave card having an indicator to distinguish between a slave card and a master card;

checking the master card with the card reader on said bus, and checking for said indicator, and if said inserted card is a master card, then storing said master card identifier code; and inserting at least one respective student slave card into the card reader of said bus and determining whether or not the inserted slave card is a master card or a slave card by checking for said indicator, and if said card is thus identified as a slave card, then checking whether the identifier code on the slave card matches the stored master card identifier code, and if it does, providing a valid annunciation indicating that the student is on the correct bus for said respective assigned route.

* * * * *